United States Patent
Ramsey et al.

(10) Patent No.: US 7,305,413 B2
(45) Date of Patent: Dec. 4, 2007

(54) SEMANTIC AUTHORING, RUNTIME AND TRAINING ENVIRONMENT

(75) Inventors: William D. Ramsey, Redmond, WA (US); David N. Weise, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 11/011,808

(22) Filed: Dec. 14, 2004

(65) Prior Publication Data

US 2006/0129591 A1    Jun. 15, 2006

(51) Int. Cl.
*G06F 7/00* (2006.01)
*G06F 17/30* (2006.01)

(52) U.S. Cl. .......................................... 707/102; 707/4
(58) Field of Classification Search ................ 707/2–4, 707/101, 102; 706/11, 934
See application file for complete search history.

(56) References Cited

U.S. PATENT DOCUMENTS

| | | | | |
|---|---|---|---|---|
| 5,386,556 A | * | 1/1995 | Hedin et al. ................ | 707/4 |
| 5,548,749 A | * | 8/1996 | Kroenke et al. ............ | 707/102 |
| 2003/0212543 A1 | * | 11/2003 | Epstein et al. .............. | 704/9 |
| 2004/0083199 A1 | * | 4/2004 | Govindugari et al. ....... | 707/1 |

OTHER PUBLICATIONS

Allen, Joshua. "Making a Semantic Web." Feb. 11, 2001. pp. 1-15. Retrieved Mar. 27, 2007 from <http://www.netcrucible.com/semantic.html>.*
O.J. Winghart, "Test set construction of Natual Language Interface to a Database", Nov. 1993, IBM Technical Dsiclose Bulletin, pp. 305-306.*

* cited by examiner

*Primary Examiner*—Don Wong
*Assistant Examiner*—Hung Tran Vy
(74) *Attorney, Agent, or Firm*—Westman, Champlin & Kelly, P.A.

(57) ABSTRACT

A system for developing semantic schema for natural language processing has a semantic runtime engine and a semantic authoring tool. The semantic runtime engine is adapted to map a natural language input to a semantic schema and to return the mapped results to an application domain. The semantic authoring tool is adapted to receive user input for defining the semantic schema and to interact with the semantic runtime engine to test the semantic schema against a query.

19 Claims, 10 Drawing Sheets

SEMANTIC AUTHORING, RUNTIME AND TRAINING ENVIRONMENT

BACKGROUND OF THE INVENTION

The present invention relates to semantic authoring tools, and more particularly, to semantic authoring and training tools for mapping natural language input into a runtime.

Semantic systems attempt to map a natural language input string, such as "find all email from Bill to David about semantics", to a schema, such as a schema for an email program called "Fastmail" (e.g. "Fastmail.email [from="Bill", to="David", subject="semantics"]. In order to generate this mapping, a programmer (author) creates a schema that defines an application domain. For Example, the schema defines an object such as a Fastmail.email object that includes several relationships. One such relationship can be called "to" with a destination type "person", a relationship "from" with a destination type "person", and a relationship called "subject" with a destination type "string".

The schema is loaded into a semantics engine, and the programmer (author) hopes that it compiles, that it actually represents the domain properly, and that the schema can handle the range of inputs that will be given to it. Typically, the programmer (author) then tunes the system using queries obtained by or from users, creates a set of expected results, and uses those results to compile a statistical model.

This process for creating a natural language schema can be laborious and prone to errors. Without any schema validation, it is easy for a programmer to make errors in the schema that are only caught at compile time by the semantics engine. In addition, by separating the authoring of the natural language component from the runtime on which it operates, the programmer (author) is unable to determine if the schema appropriately models the domain.

Conventionally, semantic schemas are created independently of the runtime engine, so that the author of the semantic schema cannot know how well the schema will work (or even if the schema will work) until the author opens a separate application that can load the schema. Since the authoring environment is independent from the runtime, there is no schema validation, and it is very easy to create improper schemas that will not compile, that are inefficient for the task, or that are incapable of representing the desired domain.

There is ongoing need for natural language authoring, runtime, and training tools for interfacing with existing program domains. Embodiments of the present invention provide solutions to these and other problems and provide advantages over existing semantic authoring tools.

SUMMARY OF THE INVENTION

A system for developing semantic schema for natural language processing has a semantic runtime engine and a semantic authoring tool. The semantic runtime engine is adapted to map a natural language input to a semantic schema and to return the mapped results to an application domain. The semantic authoring tool is adapted to receive user input for defining the semantic schema and to interact with the semantic runtime engine to test the semantic schema against a query.

DETAILED DESCRIPTION OF ILLUSTRATIVE EMBODIMENTS

The present invention is an integrated authoring environment for the construction, runtime and tuning of semantic domains. The authoring environment is adapted to produce a schema that has been developed, debugged and tuned against a particular application domain. The semantic authoring environment provides a means by which the user can create valid semantic schemas to model an application domain, to run sample queries through the schema and against the domain, and to modify and/or tune this schema as needed to model the domain appropriately.

Figure 1:
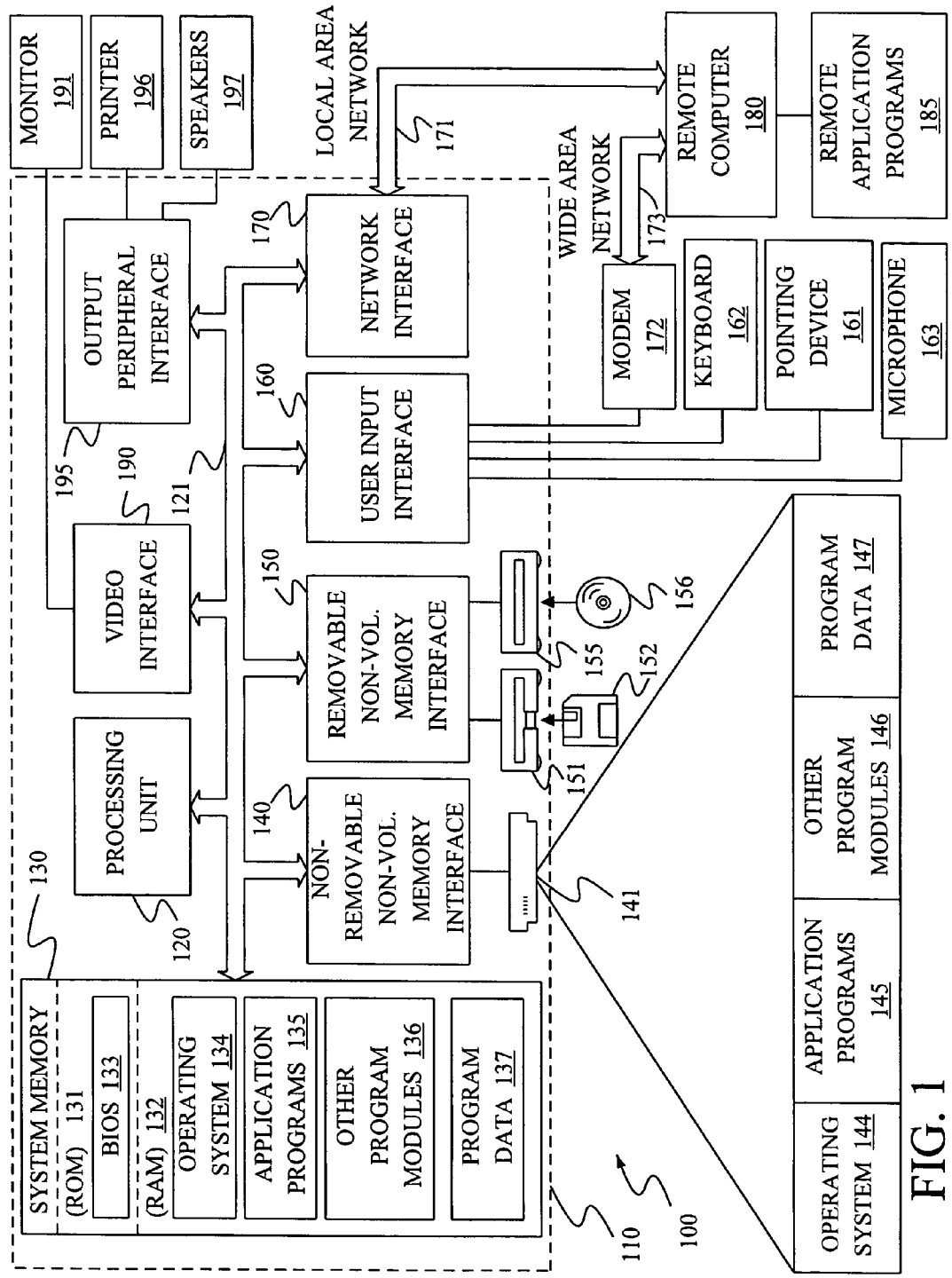
FIG. 1 is a diagrammatic view of a computing system environment on which an embodiment of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
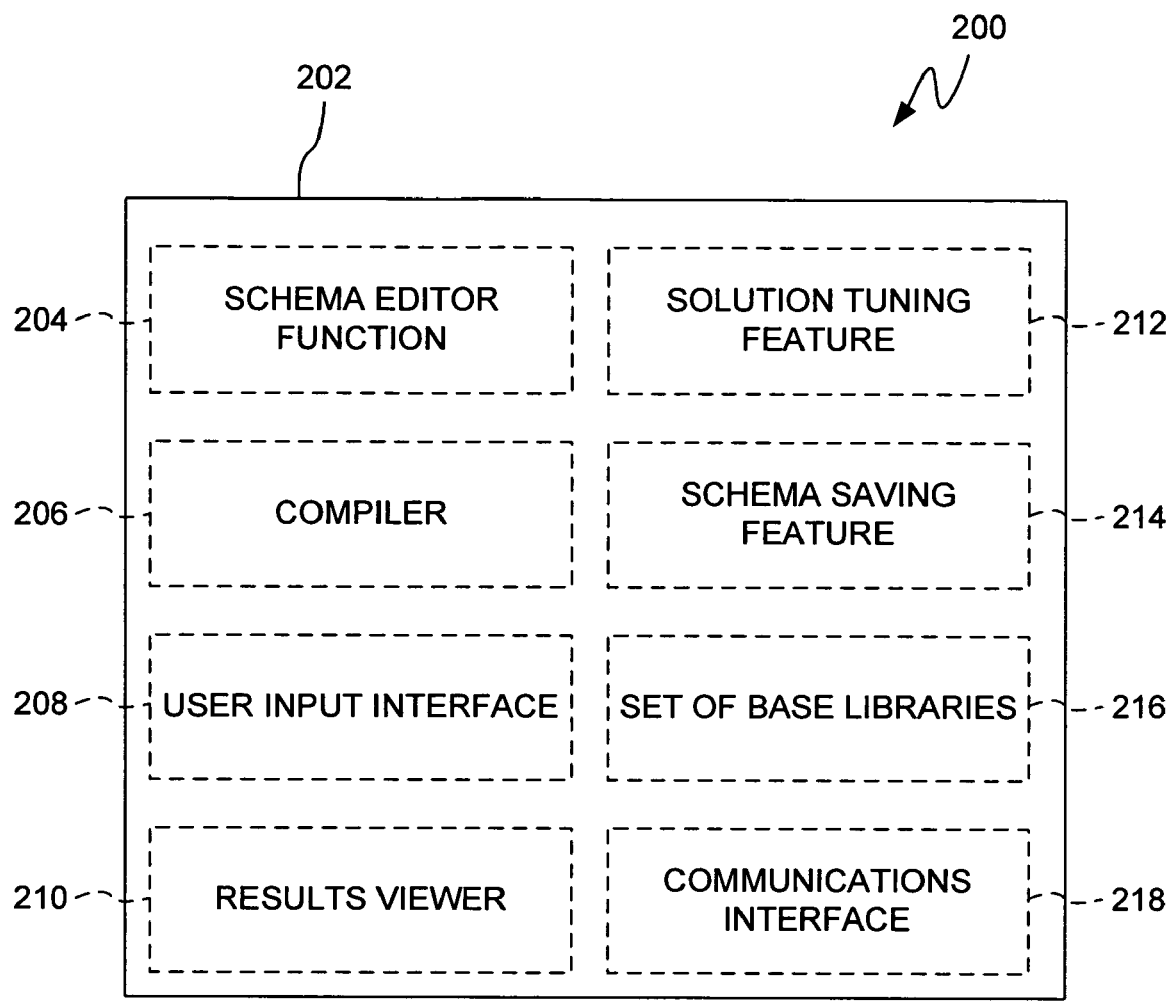
FIG. 2 is a simplified block diagram of a semantic authoring tool according to an embodiment of the present invention.

FIG. 2 is a simplified block diagram of a semantic authoring environment 200 according to an embodiment of the present invention. The semantic authoring environment 200 includes a design tool 202 with a plurality of functions or features, some of which are illustrated as blocks with the design tool 202. These blocks (elements 204-218) are provided for illustration purposes only, and are not necessarily separate elements within the design tool 202.

The design tool 202 includes a schema editor feature (or function) 204, a compiler 206, a user input interface 208, a results viewer 210, a solution tuning feature 212, a save feature 214, a set of base libraries 216, and a communications interface 218. The schema editor feature 204 is adapted to allow a user or operator to build and modify schemas that model application domains. The compiler 206 is adapted to compile the schema into a binary format or other form or format, which can be loaded into a semantic engine. In one embodiment, the schema is in an Extensible Markup Language (XML) format, which can be loaded into the semantic engine directly (i.e. the semantics engine parses the XML file and loads objects accordingly). The user input interface 208 provides an input means that allows the user or author to enter queries for interaction with the schema via the semantic engine. The results viewer displays semantic results (semantic solutions) produced by the semantic engine according to the schema. The solution tuning feature 212 provides a means by which a user or operator can select which semantic solution is the correct one. Additionally, the solution tuning feature 212 returns the user selection information back into the semantic engine for training. The save feature 214 provides a means for saving the schema. The set of base libraries 216 includes a plurality of objects, such as string objects, number objects, data and time recognition objects, and the like. Finally, the communications interface 218 provides a means by which the design tool 202 can communicate with a runtime and a semantic engine.

Figure 3:
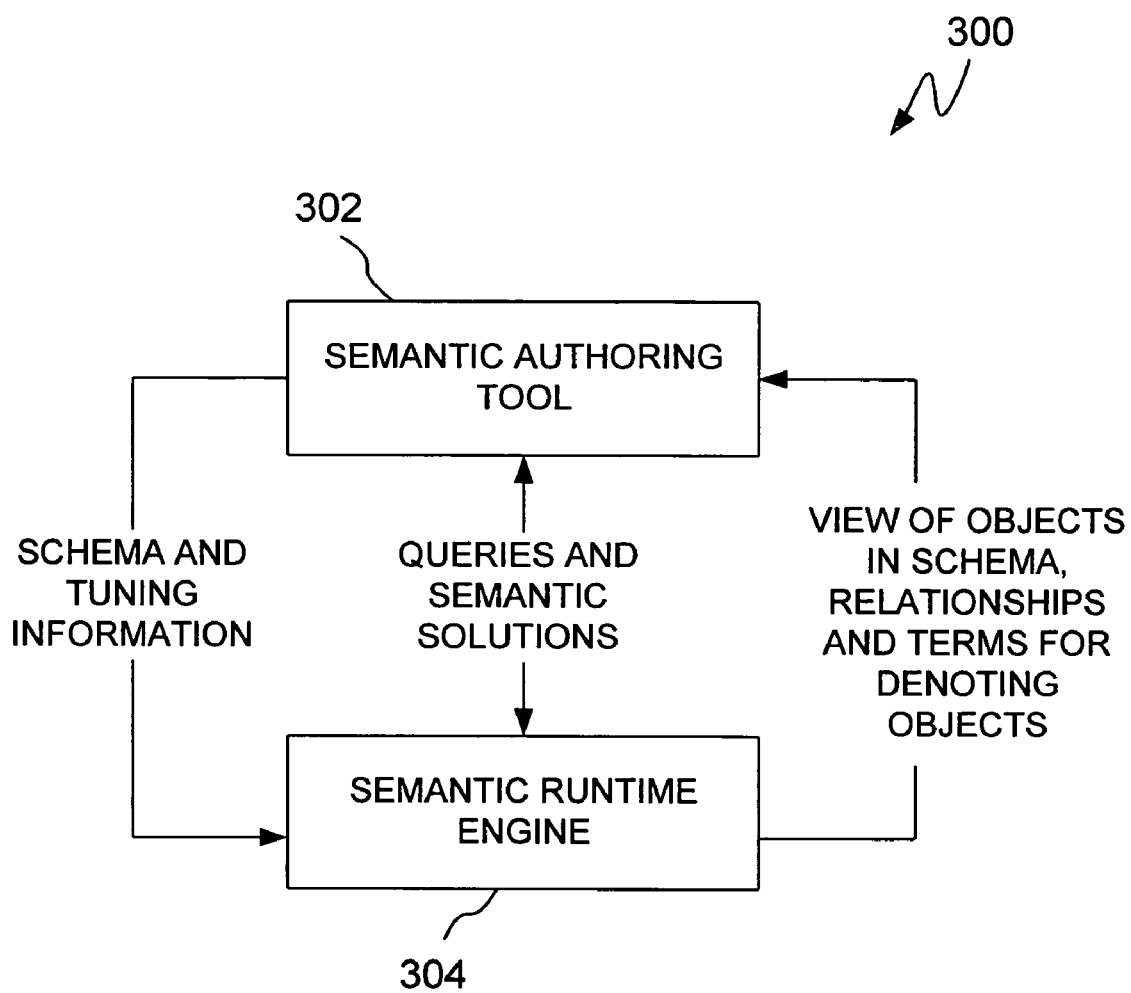
FIG. 3 is a simplified block diagram of a semantic environment showing authoring, runtime, and tuning elements of the system according to an embodiment of the present invention.

FIG. 3 is a simplified block diagram of the semantic authoring environment 300 according to an embodiment of the present invention. The semantic authoring environment 300 includes a semantic authoring tool 302 that is coupled to or in communication with a semantic runtime engine 304. The semantic authoring tool 302 provides a user interface within which an operator or user can build a schema, debug the schema, view information from the runtime engine, and tune the schema to provide desired semantic results.

Generally, the user creates a schema using the semantic authoring tool 302. The schema and schema updates are sent from the semantic authoring tool 302 to the runtime engine 304 and compiled. The runtime engine 304 provides a full view into the objects in the schema, relationships between objects, and terms used to denote the various objects. Queries are passed from the semantic authoring environment 302 to the runtime engine 304. The runtime engine 304 processes the queries and returns results to the semantic authoring environment 302. The operator or author can then tune the results using the semantic authoring tool 302, which passes the tuning information to the runtime engine 304. Thus, the semantic authoring tool 302 can be used to tune the semantic solutions generated by the runtime 304 using the schema, and the tuning information can be incorporated dynamically into the ranking scheme of the runtime engine 304.

By integrating the authoring process with the tuning and testing process, the task of creating and tuning natural language schemas is greatly simplified and improved. The authoring tool 302 provides both schema validation and an insight into how the schema processes input queries.

Figure 4:
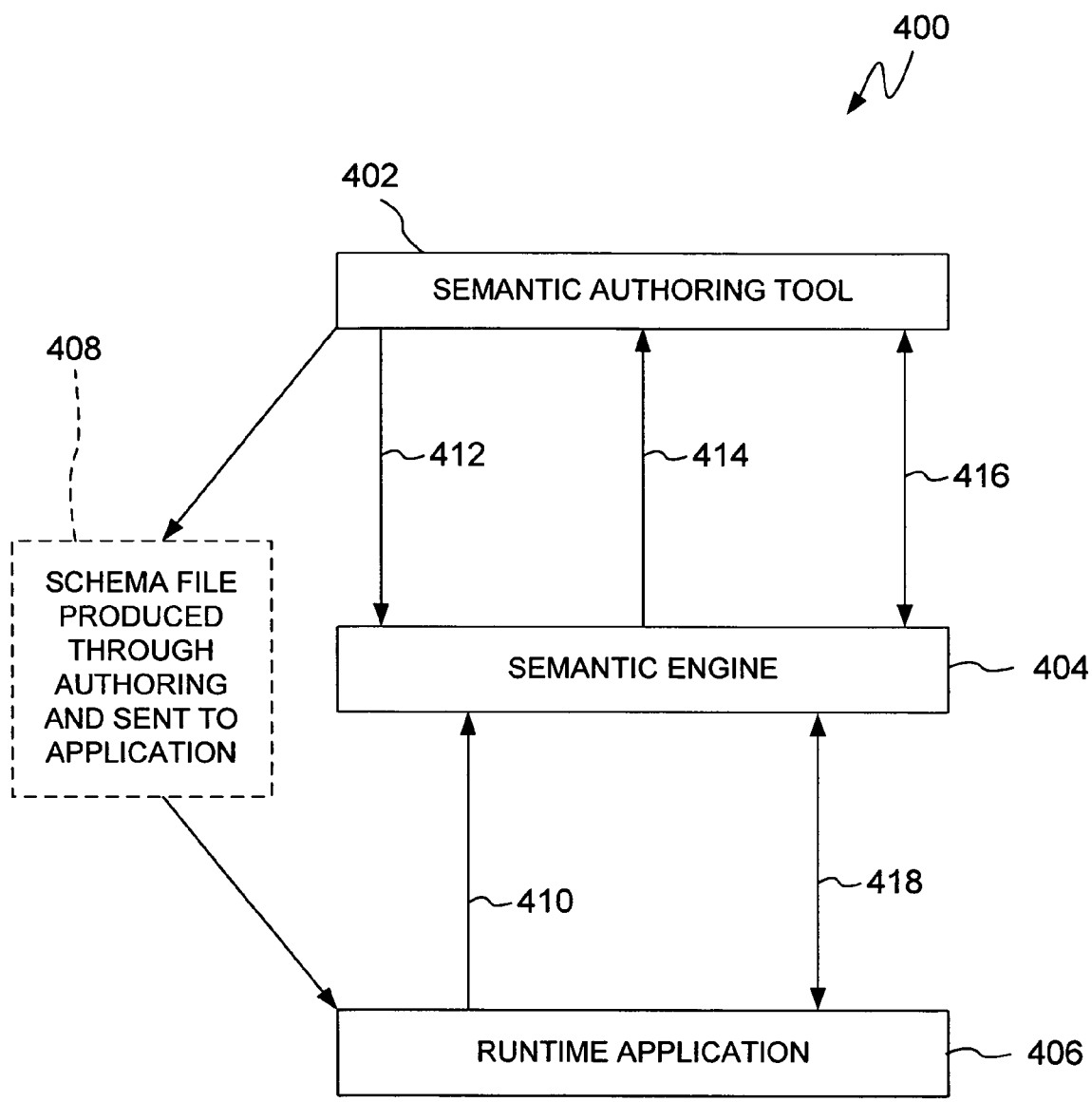
FIG. 4 is a simplified block diagram illustrating interaction between an authoring application, a runtime application, and a semantic engine according to an embodiment of the present invention.

FIG. 4 is a simplified block diagram of a semantic authoring environment 400 according to an embodiment of the present invention. The semantic authoring environment 400 includes a semantic authoring tool 402, a semantic engine 404, and a runtime engine 406, which processes information according to a schema 408. Generally, an operator or user produces the schema 408 using the authoring tool 402. The schema 408 is then sent to the runtime application 406. The runtime application 406 initializes the semantic engine 404 by passing the schema 408 to the semantic engine 404 (indicated by arrow 410). This is how the semantic engine 404 knows about the application domain. During operation, and the runtime application 406 passes text to the semantic engine 404, and the semantic engine 404 maps the text to the objects defined in the schema and returns the semantic solutions to the runtime application 406 (indicated by double-ended arrow 418).

During testing and tuning phases of development, the authoring tool 402 is used to specify objects (such as "Email", "Email->From", "Email->To", and the like). The authoring tool 402 passes the specified objects and other information to the semantic engine 404 (indicated by arrow 412). In return, the semantic engine 404 passes information about the application domain to the authoring tool 402 for displaying to the author or operator (indicated by arrow 414). The operator or user can then test the schema using the authoring tool 402 to pass text to the semantic engine 404, which processes the text against the schema and returns semantic solutions to the authoring tool 402 (indicated by arrow 416). The user or operator modify the schema so that sentences are mapped correctly, based on the returned results. Updated schema can then be forwarded by the authoring tool 402 to the runtime application 406.

Figure 5:
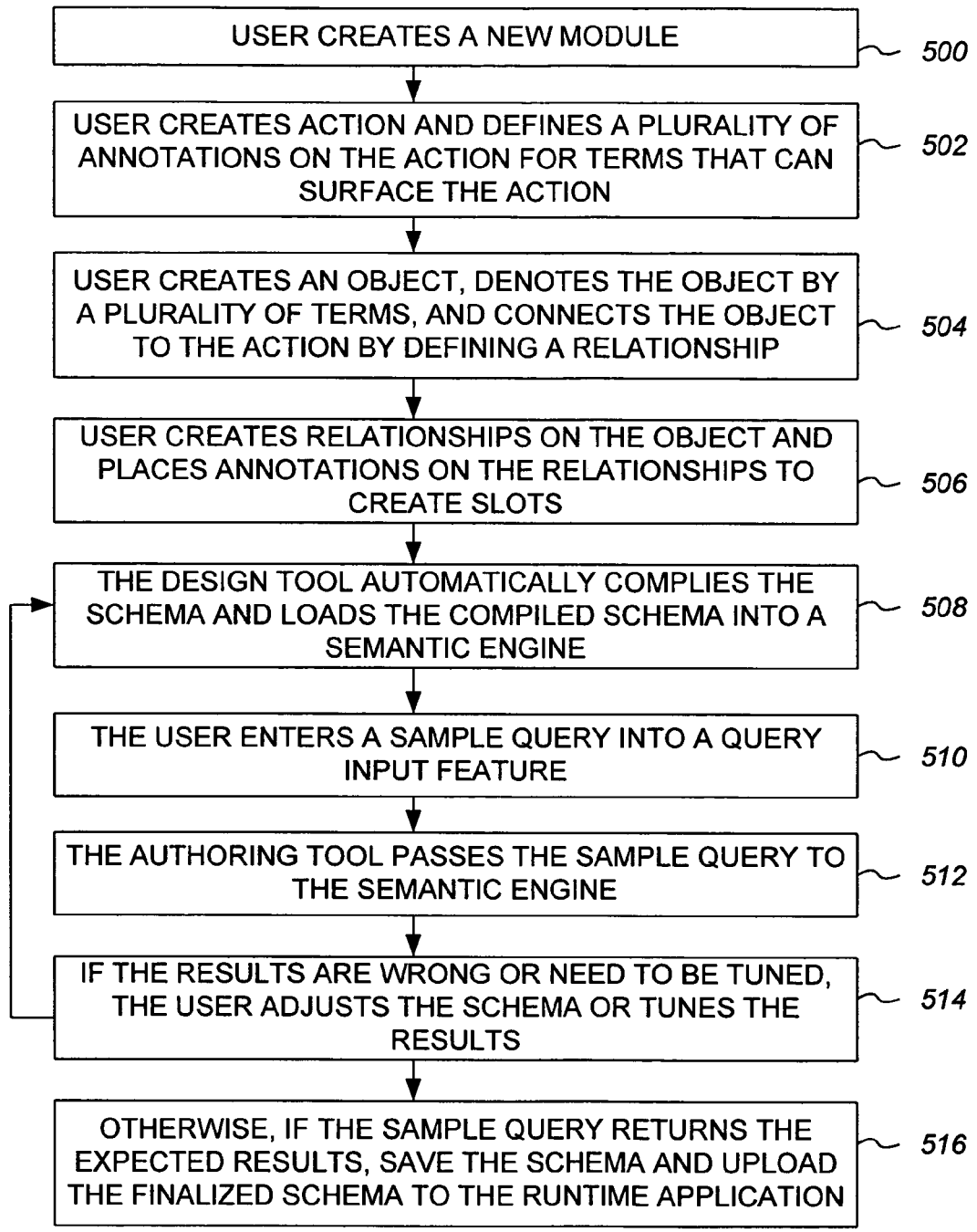
FIG. 5 is simplified flow diagram of a schema authoring process according to an embodiment of the present invention.

FIG. 5 is a simplified flow diagram of a schema development process according to an embodiment of the present invention. Using the design tool with a query input feature, the user creates a new module (block 500). The user creates an action (such as "show") and defines a plurality of annotations on the action for terms that can surface the action (such as "display", "find", "list", or "show") (block 502). The user creates an object (such as an email object), denotes the objects by a plurality of terms (such as "mail", "email", "e-mail", and the like), and connects the object to the action "show" by defining a relationship (such as "HasEmail") (block 504). The user then creates relationships on the email object (such as "To", "From", "about", and the like), and places annotations on the relationships to create slots (for example, "IsFrom", "IsTo", and "HasSubject" relationships) on the email object (block 506). The design tool automatically compiles the schema and loads the compiled schema into a semantic engine (block 508). The user enters a sample query into the query input feature (block 510). The authoring tool passes the sample query to the semantic engine (block 512), and the results are returned (block 514). If the results are wrong or need to be tuned, the user adjusts the schema or tunes the results (block 516), and steps 508 and sequence are repeated until the sample query returns the expected results.

As will become clear from the discussion of FIGS. 6-12, if the query input feature contains a sample query, each addition or change to the module can be compiled, loaded and tested against the sample query automatically. FIGS. 6-12 step through a series of screen depictions of the process for creating a schema to model the phrase "find email from bill to david about semantics".

Figures 6, 7:
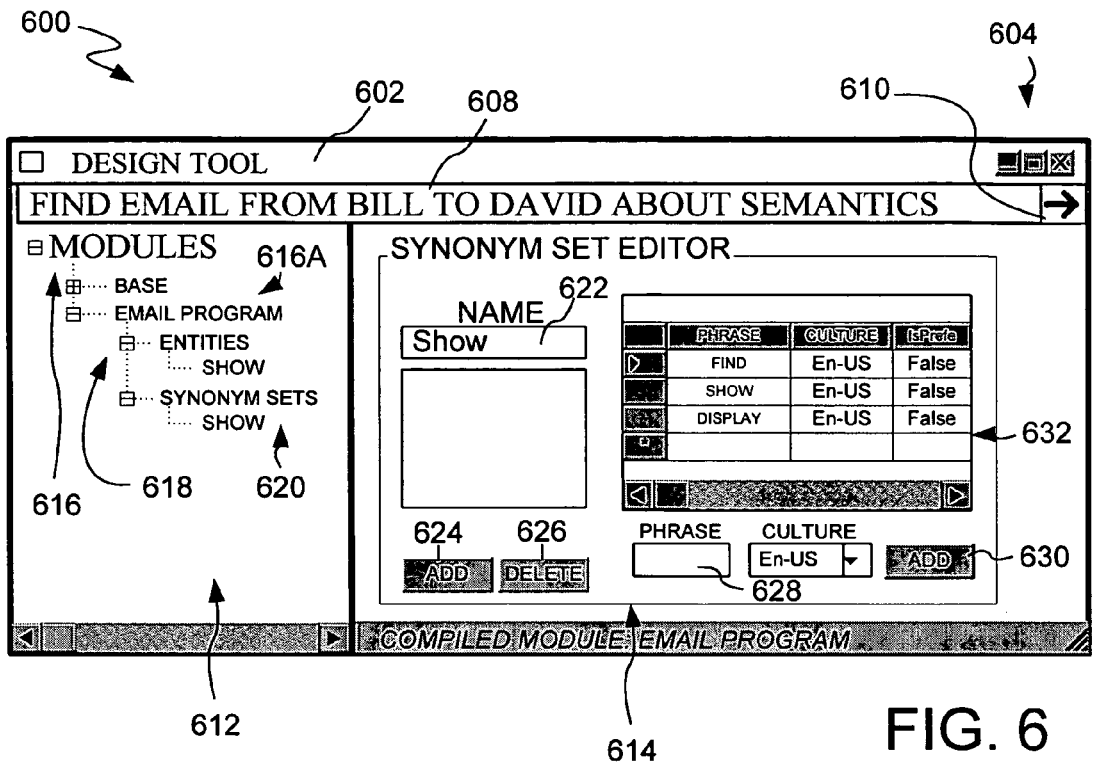
FIG. 6 is a screen depiction of a synonym set feature of a semantic authoring tool showing a setup for the term "FIND" according to an embodiment of the present invention.
FIG. 7 is a screen depiction of a test feature of the authoring tool displaying solutions for a test query based on the setup of FIG. 6 according to an embodiment of the present invention.

FIG. 6 is a screen depiction of a synonym set feature of a semantic authoring tool showing a setup for the term "FIND" according to an embodiment of the present invention. A graphical user interface (GUI) 600 displays elements of the design tool. The GUI 600 includes window 602 with a title bar 604 and with standard buttons 606 for minimizing, enlarging or closing the window. A query input box 608 is provided for entering sample queries, and a button 610 is provided to trigger a sample query. The window 602 is divided into a list portion 612 and a display portion 614. The user can create a module 616, for example, by right-clicking with a mouse in the list portion 612. Elements associated with the module can then be created as sub-elements to the module. In this instance, the user creates a new module called "Email Program" module 616A. The user then creates a sub-element that is an action 618 of the email program module 616A called "show". The user then places annotations on the action (or entity) 618 by creating a synonym set 620 containing the element "show". By selecting the "show" element of synonym set 620, the design tool displays in display portion 614 the synonym set editor associated with the selected synonym. Here, the user can enter one or more synonyms, which provide a means whereby the semantic engine can recognize terms that should trigger (surface) the action "show".

In general, the user can add additional synonyms by typing the synonym name in text box 622 and clicking add button 624. Synonyms can be deleted from a list by clicking a delete button 626. Synonyms can be related to the selected action by typing the word in text box 628 and clicking add button 630, which places the word in the synonym list 630. The user can indicate that one synonym is preferred over another by changing the IsPreferred field in the list 630.

The design tool automatically compiles the schema and loads the schema into a semantic engine. If the query "find email from bill to david about semantics" is typed into the query input box 608, the sample search is provided to the semantic engine, which returns results as shown in FIG. 7.

FIG. 7 is a screen depiction of a test feature within the GUI 700 of the authoring tool displaying solutions for a test query based on the setup of FIG. 6 according to an embodiment of the present invention. The GUI 700 includes a window 702 with a title bar 704 and with standard buttons 706 for minimizing, enlarging or closing the window. A query input box 708 is provided for entering sample queries, and a button 710 is provided to trigger a sample query. The window 702 is divided into a list portion 712 and a display portion 714. Within the list portion 712, a hierarchical list of elements defined within the module is shown. In the display portion, semantic solutions are shown. In this instance, a single semantic solution is shown for the entity indicator "find", and the rest of the phrase was ignored by the semantic engine.

Figure 8:
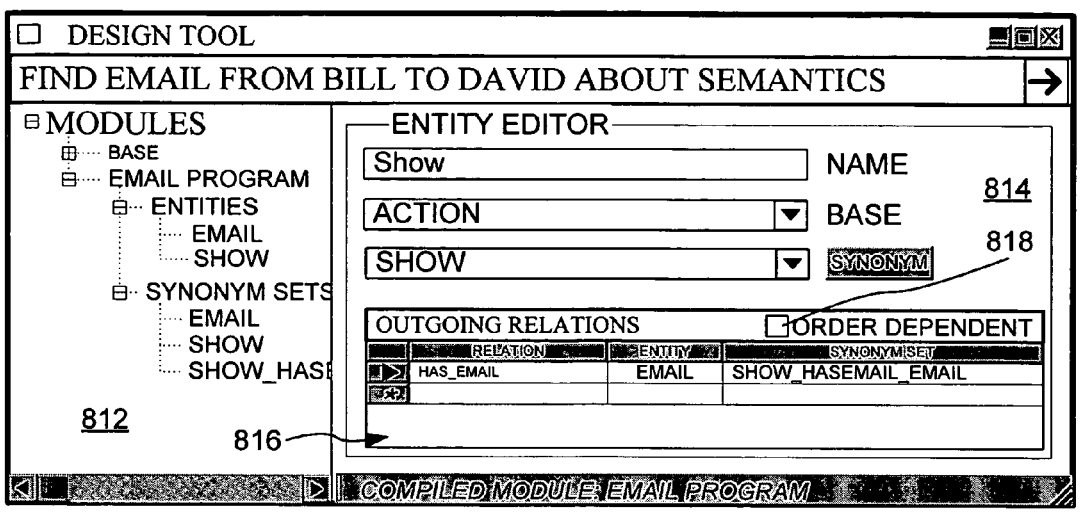
FIG. 8 is a screen depiction of an entity editor of the authoring tool defining an entity type according to an embodiment of the present invention.

FIG. 8 is a screen depiction of an entity editor within a GUI 800 of the authoring tool defining an entity type according to an embodiment of the present invention. Elements of the GUI 800 are similar to those shown in FIG. 7. Within the list portion 812, the user creates an entity of type "Email" and an associated synonym list. Additionally, the user defines a relationship between the action "show" and the entity "email" called "Show_HasEmail_Email". In the display portion 814, the entity editor displays the action, and the user defines the relationship within an outgoing relations list box 816. The outgoing relations list box 816 provides an order dependent check box 818, which provides a means whereby a user can specify an ordering preference for the relationship (for use by the semantic engine).

Figure 9:
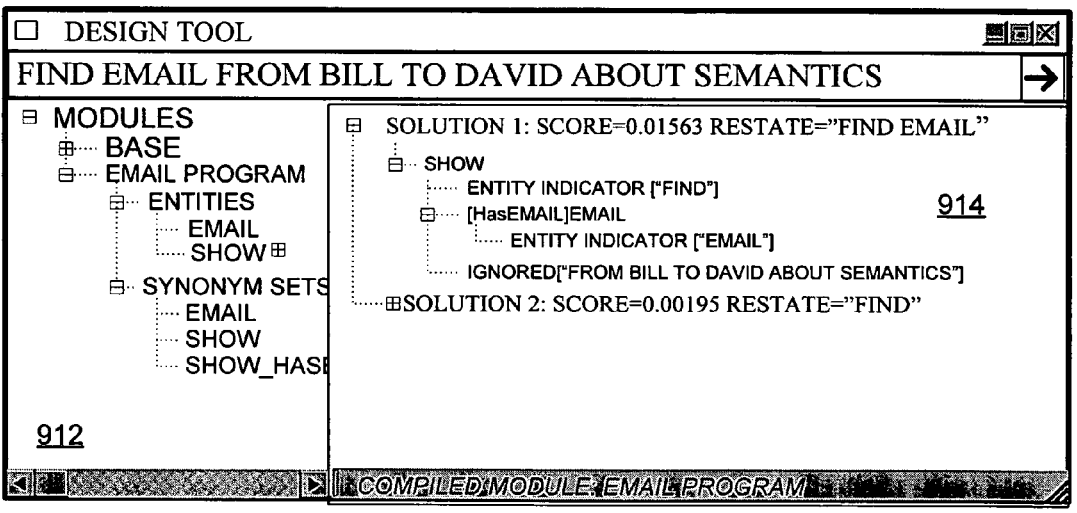
FIG. 9 illustrates a screen depiction of a test feature of the authoring tool displaying solutions for a test query based on the entity set up of FIG. 8 according to an embodiment of the present invention.

In FIG. 9, schema has been compiled and loaded to a semantic engine along with the sample query, and the resulting semantic solutions are shown for the defined action, entity and relationship in GUI 900 of the design tool application. Within the list portion 912 of the GUI 900, a list of defined elements are shown. Within the display portion 914, two solutions are shown. Solution one has a score of 0.01563 and is restated as "find email", with an entity indicator of "find" and a HasEmail entity indicator of "email". The phrase "from bill to david about semantics" is ignored. Solution two has a score of 0.00195 and is restated as "find". The lower score is indication of fewer matching elements between the query and the schema.

This shows that the schema is able to model both the "show" action and the "email" entity. The next step is to create slots for "IsTo", "IsFrom" and "HasSubject" relationships on the email object. To do this, the user creates three or more relationships and places annotations on the relationships such as the words "To", "From", and "About".

Figure 10:
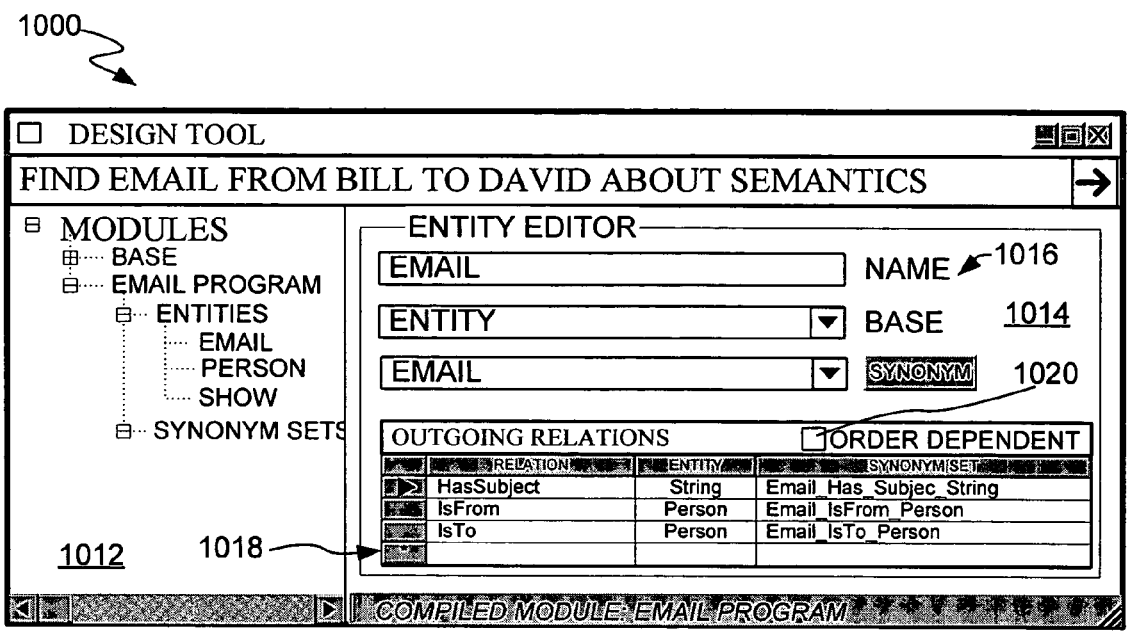
FIG. 10 illustrates a screen depiction of an entity editor of the authoring tool defining a relationship between a defined entity and a related subject according to an embodiment of the present invention.

FIG. 10 illustrates a screen depiction of a GUI 1000 of the authoring tool defining a relationship between a defined entity and a related subject according to an embodiment of the present invention. In a list portion 1012, a list of defined elements within the schema is shown. In the display portion 1014, the entity editor provides a list of pull-down items 1016, a list of outgoing relations 1018 associated with the pull-down items 1016, and a checkbox 1020 for specifying order dependence of the outgoing relations list 1018.

Figure 11:
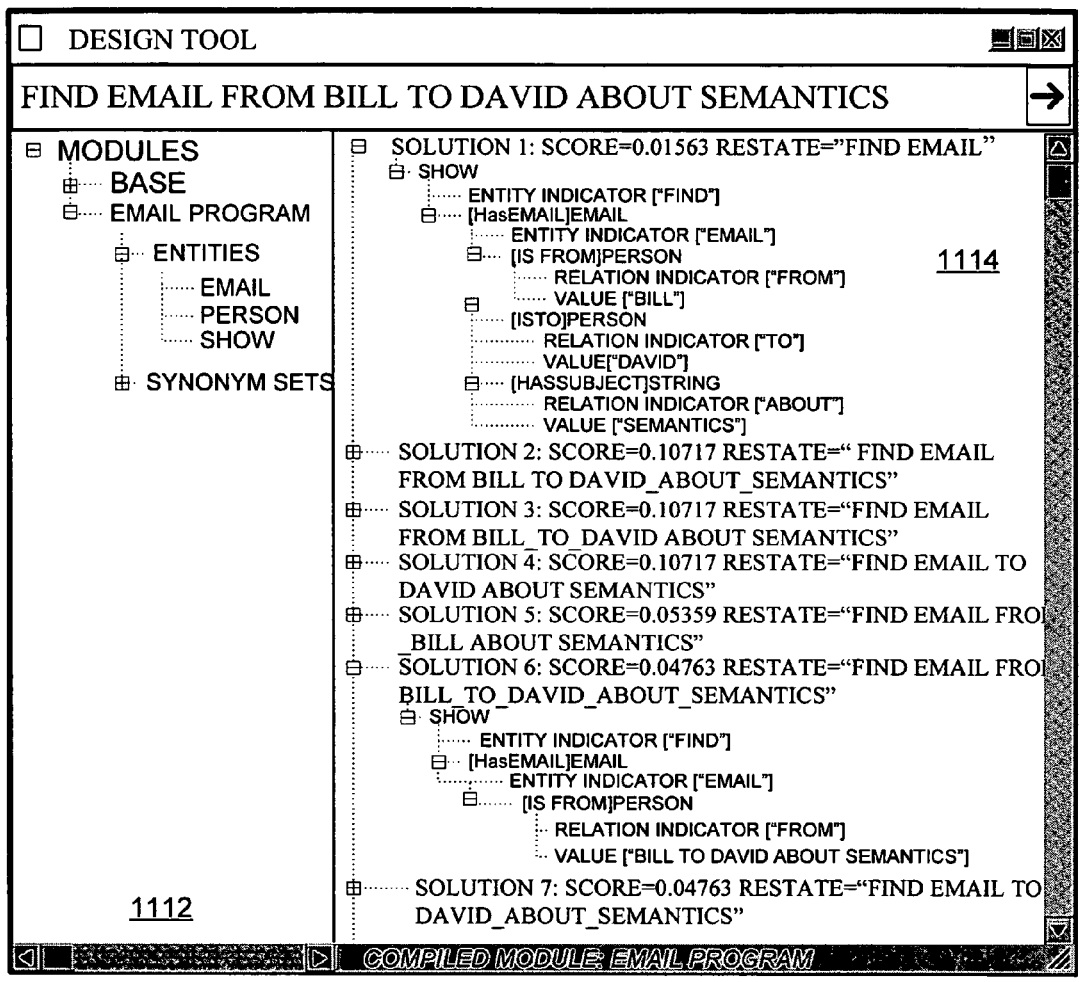
FIG. 11 illustrates a simplified screen depiction of a test feature of the authoring tool displaying semantic solutions for a test query based on the defined relationship of FIG. 10 according to an embodiment of the present invention.

In FIG. 11, the schema of FIG. 10 has been compiled and provided to a semantic engine together with the query "find email from bill to david about semantics". In this instance, in the list portion 1112 of the GUI 1100 contains a list of the defined elements of the schema. The display portion 1114 contains a list of solutions with an associated score. This solutions list in the display portion 1114 shows that the schema is able to model the "show" action, the "email" entity, and the three relationships ("IsTo", "IsFrom" and "HasSubject"). The semantic engine also returns solutions 2 through N (with the first seven solutions shown) in a heuristic ordering. Solution 1 has a score of 0.01563, which is a numeric score that represents a "best guess" as to the correct mapping of the query to the schema, whereas solution 7 has a score of 0.04763. The scores are numbers generated by, for example, a semantics engine. The scores may or may not be statistically based, depending on the specific implementation. In one embodiment, the scores represent a combination of heuristics and statistics. Since there is inherent ambiguity with semantic solutions, the sixth solution shows that a valid interpretation might have been "show email from" the person named "Bill to David about semantics", which is not a very common name. Fortunately, solution one is correct in this instance.

Generally, the preceding figures have illustrated how the process works for creating schemas and working with the runtime to validate the schemas. Additionally, the design tool is adapted to show the semantic solutions produced by the semantic engine given the current schema. It is safe to assume that the schema design and testing process would have taken much longer if the authoring environment were separated from the runtime.

Figure 12:
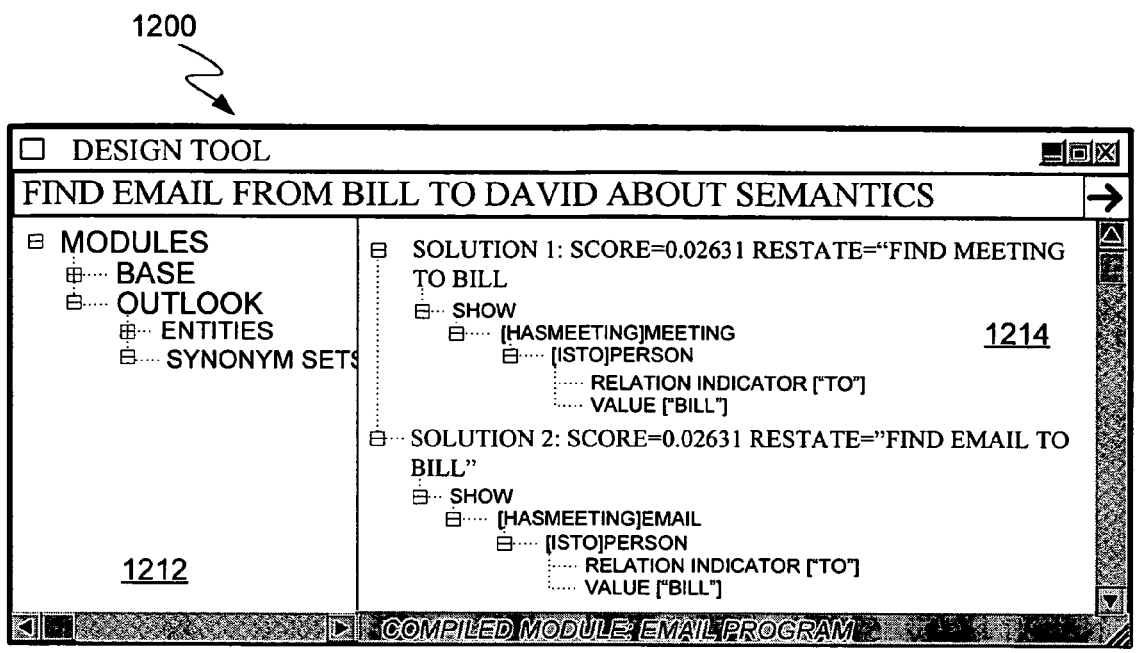
FIG. 12 is a screen depiction of a tuning feature of the semantic authoring tool for weighting solutions according to an embodiment of the present invention.

FIG. 12 is a screen depiction of a tuning feature of the semantic authoring tool for weighting solutions to improve the results according to an embodiment of the present invention. A GUI 1200 is provided with a list portion 1212 and a display portion 1214. The list portion 1212 contains a hierarchical list of elements defined by the schema. The display portion 1214 shows a list of solutions produced by a semantic engine based on the compiled schema and a test query. Suppose that the system modeled a Meeting Object, which also has an "IsTo" (Person) relationship. If the sample query includes the phrase "to Bill", the query can easily relate to an email object or a meeting object in the absence of other information. However, the GUI 1200 of the design tool is adapted to allow the user or author to bias the decision-making to favor one over the other.

For example, if the author wants to bias decision-making toward email since that is what people search for most, the user can select one of the solutions and, for example, mark the solution as being correct to bias the semantic engine toward the selected object. In this instance, if we want to bias toward email, the email solution can be marked as correct. Alternatively, the user can change the score of one to reflect a greater or lesser likelihood to scale the accuracy of the result to favor one over the other numerically. The authoring tool then provides the tuning information to the semantic engine.

This trains the system so that the next time the query is run, the results are displayed in the proper order. Without integrating the tuning and the runtime, this process is difficult to manage. Moreover, it is difficult to determine how the system is reacting to the training information.

The present invention is a semantic authoring tool, which can be implemented as part of a larger software development kit, or which can be implemented as a stand-alone schema authoring tool. Preferably, the authoring tool is integrated with the runtime so that the compiling, testing and tuning is integrated. This allows the user to create valid semantic schemas to model a domain, run sample queries against the schemas, and modify and tune the schemas as needed to improve the model.

Although the present invention has been described with reference to particular embodiments, workers skilled in the art will recognize that changes may be made in form and detail without departing from the spirit and scope of the invention.

What is claimed is:

1. A computer-implemented system for developing semantic schema for natural language processing comprising:
    a semantic runtime engine that maps a natural language input to a semantic schema and returns mapped results to an application domain;
    a semantic authoring tool that receives user input for defining the semantic schema and that also interacts with the semantic runtime engine to test the semantic schema against a query;
    a test results interface component that is an available feature of the semantic authoring tool and provides a display of the outcome of the test without requiring user interaction with an application outside of the semantic authoring tool; and
    wherein the semantic authoring tool is configured to initialize the semantic runtime engine with the semantic schema and the query, and further configured to display mapped results returned based on the semantic schema.

2. The system of claim 1 wherein the semantic authoring tool is adapted to validate the semantic schema against the application domain via the semantic runtime engine.

3. The system of claim 1 wherein the semantic runtime engine comprises:
    a semantic engine adapted to map said natural language input to a semantic schema; and
    an application domain adapted to perform an operation based on the mapped natural language input.

4. The system of claim 1 wherein the semantic authoring tool comprises:
    a compiler adapted to compile the semantic schema to a format for use by the semantic runtime engine.

5. The system of claim 1 wherein the semantic authoring tool comprises:
    a tuning feature adapted to bias results from the semantic runtime engine and to provide tuning information to the semantic runtime engine for adjusting a ranking order of mapped solutions.

6. A computer-implemented semantic authoring tool comprising:
    a schema authoring tool that receives user input for defining a semantic schema representative of an application domain, wherein the semantic authoring tool also interacts with a semantic runtime engine to test the semantic schema against a query, and wherein the schema authoring tool includes a test results interface component that is an available feature of the schema authoring tool and provides a display of an indication of the outcome of the test within the schema authoring tool itself, wherein the semantic authoring tool is configured to initialize the semantic runtime engine with the semantic schema and the query, and further configured to display mapped results returned based on the semantic schema.

7. The semantic authoring tool of claim 6 further comprising:
    a query input feature adapted to receive the query in the schema authoring tool in a natural language format.

8. The semantic authoring tool of claim 6 further comprising:
    a display feature adapted to display the mapped results, which are received from the semantic runtime engine based on the semantic schema and the query.

9. The semantic authoring tool of claim 8 wherein the mapped results are displayed in a ranked order, the semantic authoring tool further comprising:
    a tuning feature adapted to adjust the ranked order to bias the mapped results toward a desired preference.

10. The semantic authoring tool of claim 6 further comprising:
    a compiler adapted to compile the semantic schema to a format for use by the semantic runtime engine.

11. The semantic authoring tool of claim 6 wherein the semantic runtime engine comprises:
  a semantic engine adapted to map a natural language input to the semantic schema; and
  an application domain adapted to act on the mapped natural language input.

12. The semantic authoring tool of claim 6 further comprising:
  an order dependent feature adapted to receive user input and to specify an ordering of synonym mappings within the semantic schema.

13. A computer-implemented semantic authoring tool for authoring a natural language interface to an application domain comprising:
  a design tool that receives user input for defining a semantic schema representative of the application domain, wherein the design tool also compiles the semantic schema and initializes a semantic runtime engine with the semantic schema, and wherein the design tool interacts with the semantic runtime engine to test and to adjust operation of the semantic runtime engine based on a query, and wherein the design tool includes a test results interface component that is an available feature of the design tool and provides a display of the outcome of the test without requiring user interaction with an application outside of the design tool; and
  wherein the design tool is configured to initialize the semantic runtime engine with the semantic schema and the query, and further configured to display mapped results returned based on the semantic schema.

14. The semantic authoring tool of claim 13 wherein the design tool comprises:
  a query input feature adapted to receive the input from a user and to provide the input to the semantic runtime engine.

15. The semantic authoring tool of claim 13 wherein the design tool comprises:
  a compiler adapted to compile the semantic schema to a format for use by the semantic runtime engine.

16. The semantic authoring tool of claim 13 further comprising:
  a display feature adapted to interact with the semantic runtime engine to display a list of results received from the semantic runtime engine based on the semantic schema and the input.

17. The semantic authoring tool of claim 16 wherein the results are displayed in a ranked order list and wherein the semantic authoring tool further comprises:
  an adjustment feature adapted to select a result from the list of results, the selected result providing information to the semantic runtime engine for adjusting mapping of the semantic runtime engine.

18. The semantic authoring tool of claim 13 wherein the semantic runtime engine comprises:
  a semantic engine adapted to map natural language input to the semantic schema; and
  an application domain adapted to act based on the mapping of the natural language input to the semantic schema.

19. The semantic authoring tool of claim 13 wherein the design tool comprises computer readable instructions stored on a computer readable medium.

* * * * *